United States Patent
Griffin et al.

[11] 3,793,763
[45] Feb. 26, 1974

[54] INSECTICIDE DISPENSER

[75] Inventors: Charles D. Griffin; Murray L. Young; James E. Griffin, all of Brookshire, Tex.

[73] Assignee: H. T. McGill, Inc., Brookshire, Tex.

[22] Filed: Dec. 27, 1971

[21] Appl. No.: 212,237

[52] U.S. Cl. ................................................. 43/129
[51] Int. Cl. ............................................. A01m 1/20
[58] Field of Search .. 43/129, 125; 239/130; 21/119

[56] References Cited
UNITED STATES PATENTS

| 2,758,412 | 8/1956 | Loibl, Jr. | 43/125 |
| 3,250,723 | 5/1966 | Fortney | 43/125 |
| 3,694,146 | 9/1972 | Roy et al. | 43/125 |

Primary Examiner—Warner H. Camp

[57] ABSTRACT

An insecticide dispenser having a housing with a blower mounted therein and an offset thereon for receiving an insecticide pellet container, the housing defining two outlets for said blower one extending to said offset to direct flow through said container and the other outlet being directed to intercept flow out of said container, means for controlling the flow to said outlets, a heater in said housing to heat the air flowing to said containers, means for controlling the heater responsive to the temperature of gas flowing through said container, a heater shield, a manual reset excess temperature cut-off being so mounted in said housing to prevent its ready resetting and a timer for controlling operation of said blower and said heater.

10 Claims, 6 Drawing Figures

PATENTED FEB 26 1974 3,793,763

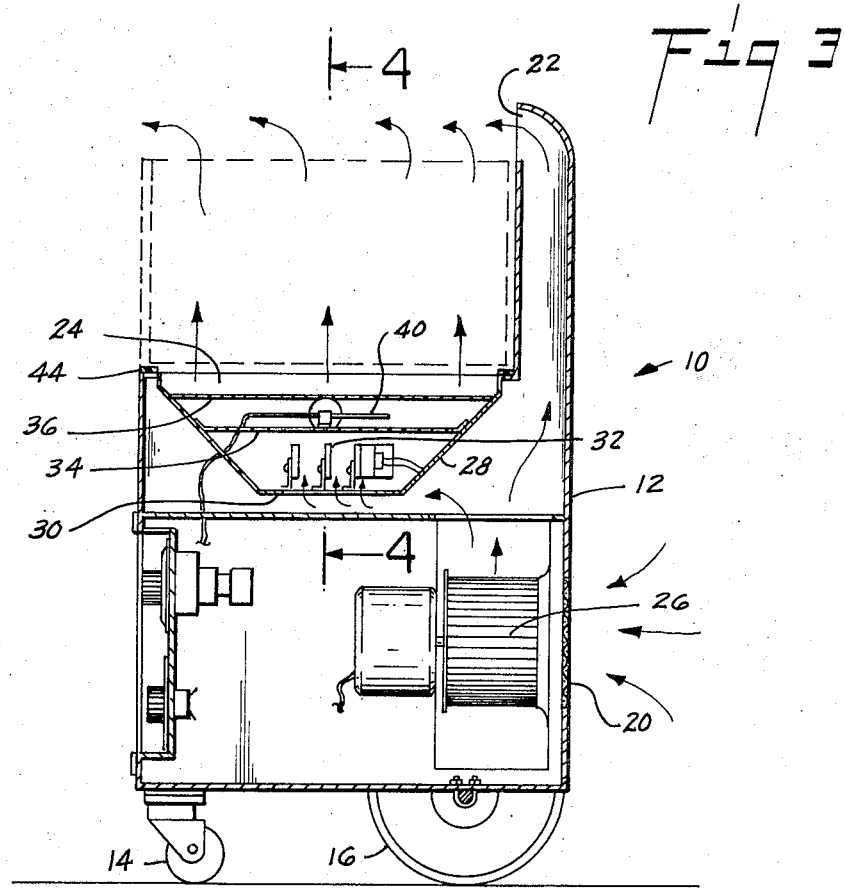
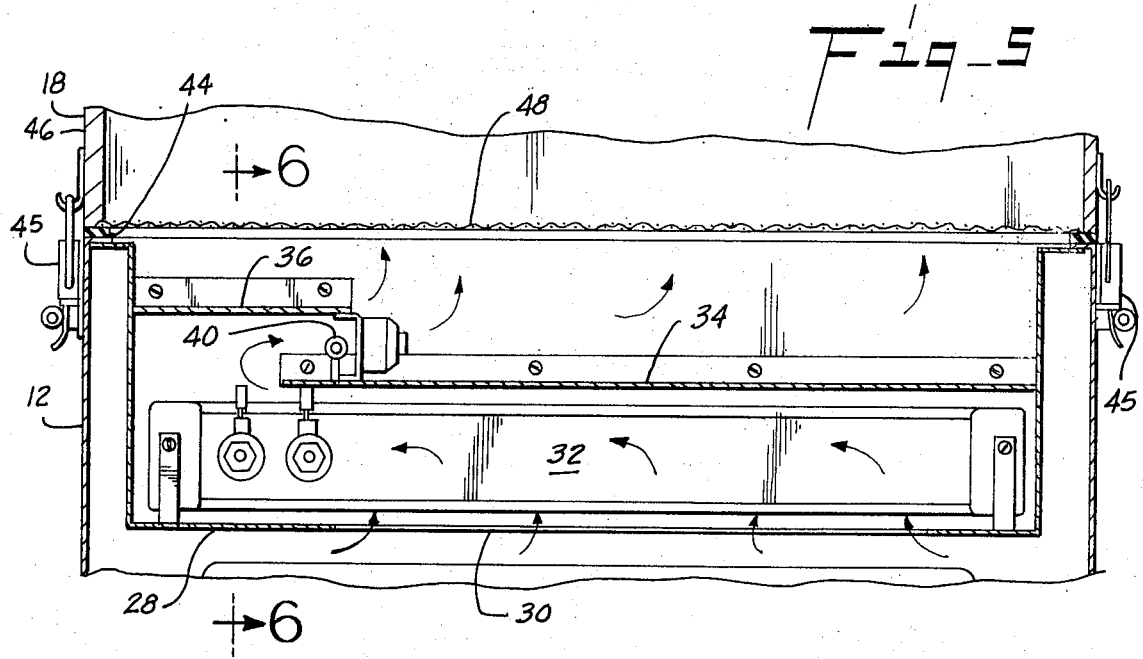

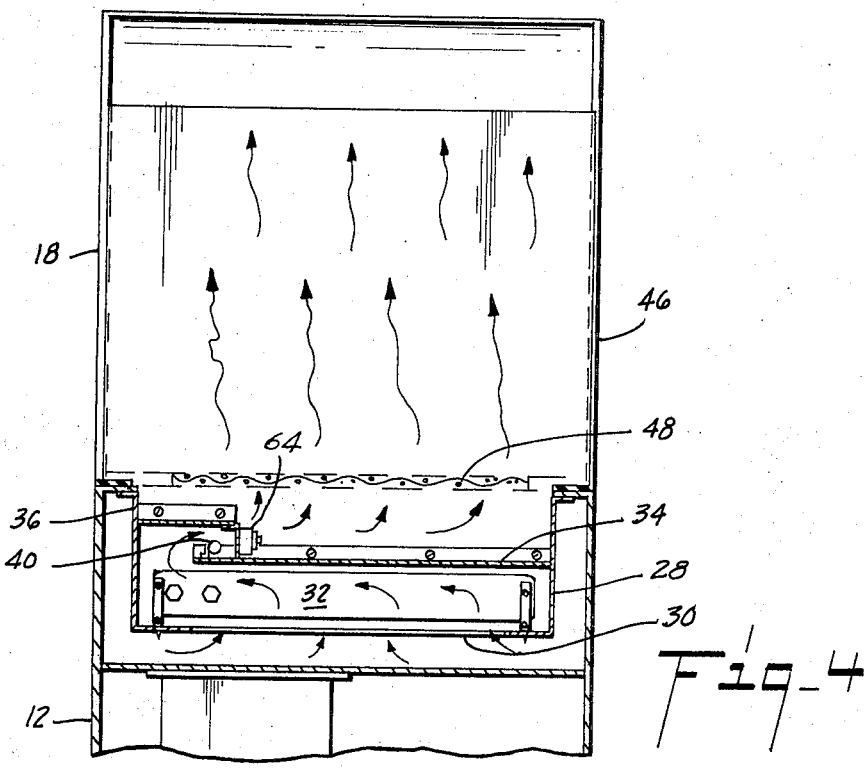
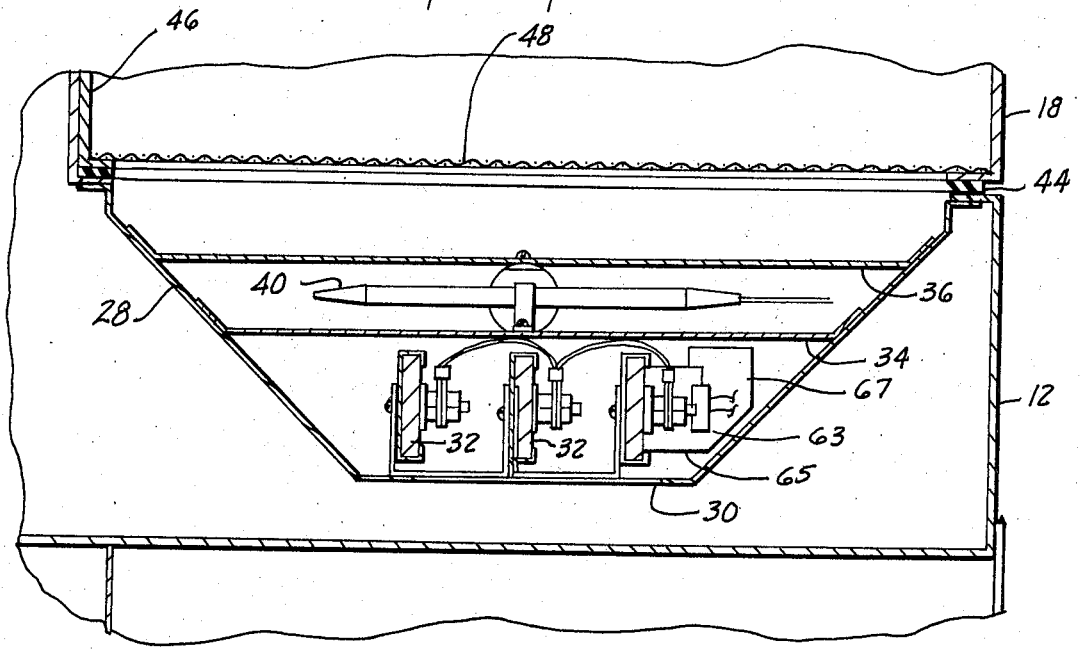

INSECTICIDE DISPENSER

BACKGROUND

With the development of 2,2-dichlorovinyl dimethyl phosphate (DDVP) insecticide pellets, a dispenser was needed for the vaporization of the insecticide. The device disclosed in U. S. Pat. No. 3,290,112 was proposed. Such device, however, had certain disadvantages such as, it did not provide for accurate control of air temperature, for accurate control of air flow, for positive shut-off responsive to overheating, for a container for the pellets which easily dump pellets and protects operator from contact with the pellets and prevents spillage, and for adequate heating from minimum power.

SUMMARY

The present invention relates to an improved dispenser for insecticide which vaporizes the insecticide from pellets and disperses the vapors throughout a relatively large area.

An object of the present invention is to provide an improved insecticide dispenser which utilizes minimum power.

Another object is to provide an improved insecticide dispenser having very close temperature control at a variety of settings over a wide range of temperature.

A further object is to provide an improved insecticide dispenser having protection against continued use when subject to overheating.

Still another object is to provide an improved portable insecticide dispenser which can be used to dispense vapors safely in a large enclosed space or building.

A still further object is to provide an improved insecticide dispenser which fully utilizes the insecticide in the pellets and protects the operator from contact with the pellets and from the heater.

BRIEF DESCRIPTION OF THE DRAWINGS

These and other objects and advantages of the present invention are hereinafter more fully set forth and explained with respect to the drawings wherein:

FIG. 3 is a sectional view of the dispenser taken along line 3—3 in FIG. 2.

FIG. 4 is a sectional view of the dispenser taken along line 4—4 in FIG. 3.

FIG. 5 is an enlarged sectional view showing details of the heating section.

FIG. 6 is another enlarged sectional view of the heating section taken along line 6—6 in FIG. 5.

DESCRIPTION OF THE PREFERRED EMBODIMENT

Figure 1:
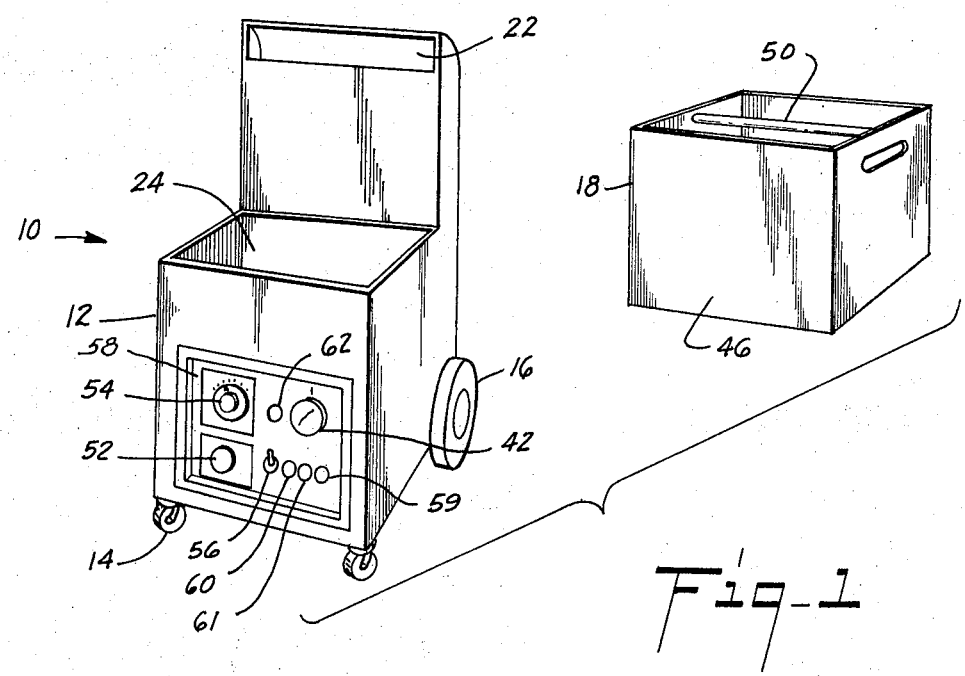
FIG. 1 is a perspective view of the improved insecticide dispenser illustrating the pellet container removed from its offset on the main housing.
Figure 2:
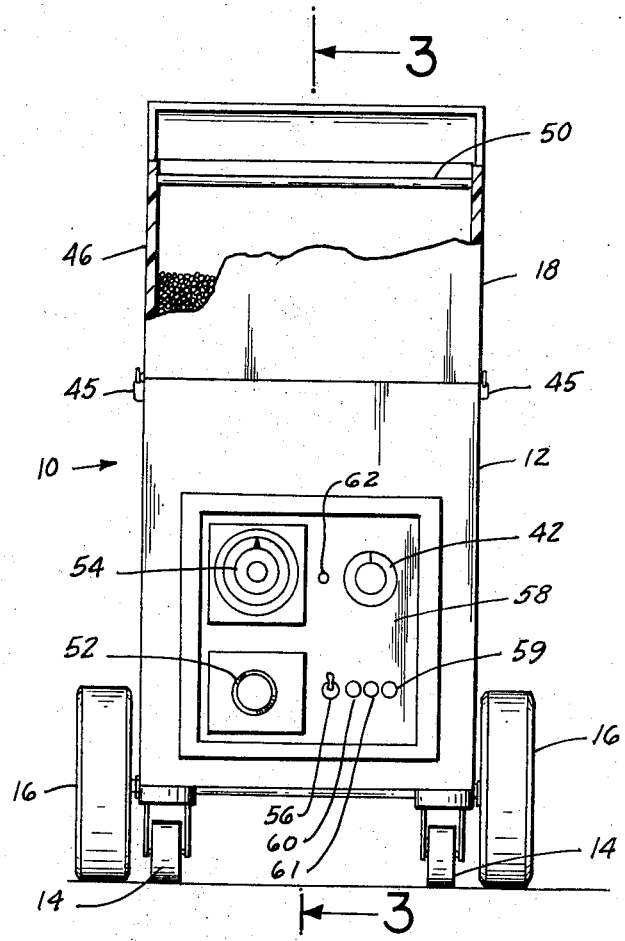
FIG. 2 is a front elevation view of the improved dispenser with a portion of the pellet container being broken away to illustrate the container structure.

The dispenser 10 shown in the drawings includes the housing 12 which is mounted on wheels 14 and 16 so that it is easily movable and the container 18 which is adapted to be positioned in the housing as hereinafter described. If desired a suitable handle (not shown) may be provided on the housing 12.

The housing 12 defines an inlet 20 and flow passages to the two outlets 22 and 24. The blower 26 is mounted within the housing 12 with its intake in communication with inlet 20. Air from blower 26 flows through the passages to the outlets 22 and 24. The air flows directly through the housing 12 to the outlet 22 from which it is discharged horizontally over the top of container 18. The air from blower 26 flows laterally under pan 28 and upwardly through the hole 30 in the bottom of pan 28, upwardly around the heaters 32, under the baffle 34 between baffles 34 and 36 and upwardly through the pellets within container 18 to be discharged out the top of container 18.

The heaters 32 are strip heaters, such as the strip heaters sole by the Edwin L. Weigand Company and identified as Chromalox SE-1250, HK6, X-69. With the device of the present invention designed to utilize a 30 pound charge of insecticide pellets, three of the strip heaters rated at 120 volts 500 watts have been found satisfactory to heat the air and cause the desired controlled release of the insecticide vapors from the pellets as hereinafter described.

Since accurate control of the temperature of the air flowing through the pellets is important to the proper operation of the dispenser, the sensing element 40 for the thermostat control 42 is mounted between baffles 34 and 36 in the direct flow path of the heated air. The sensing element 40 and thermostat control 42 are selected to provide accurate control of temperature of the heated air by controlling the heaters 32 at a plurality of temperatures over a wide range. For example, it is desired to control the air temperature to a tolerance of plus or minus 1° F. at sixteen settings between 100°F and 230°F. A thermostat sold by the Wilcolater Company and identified as a Chromalox AR-2524 has been found to provide satisfactory control of the above mentioned heaters.

The heated air flows out of outlet 24 into container 18 which is positioned on the offset defined by housing 12. A gasket 44 is provided surrounding outlet 24 to seal between housing 12 and container 18 when the container 18 is seated thereon. Since the gasket 44 in such position is subject to heating, it is selected to be heat resistant so that its exposure to heat does not affect is sealing ability. In order to tightly secure the container 18 to housing 12 the fasteners 45 are provided.

The container 18 has walls 46, a mesh or screen bottom 48 and an open top with the bar 50 extending between opposite walls at the top to provide a suitable means for handling the container 18. It is desired that the container 18 can be filled with pellets placed in the outlet 24 and after a portion of the insecticide has been vaporized the container can be easily removed and the pellets dumped into a plastic bag for storage until the next use of the pellets. With container 18, this can be done and the operator can handle the container without coming into direct contact with the pellets. Also with the handle at the top the container 18 is stable for handling and is not subject to spilling the pellets.

Since the flow of heated air over the pellets within the container 18 controls the release of the insecticide vapors from the pellets, the air flow is controlled accurately to thereby control the insecticide vaporization. By having accurate control of both the temperature and rate of air flowing through the pellets in container 18 the maximum utilization of the pellets can be obtained. With a container having a cross-sectional flow area of 163 square inches and a depth of pellets of from 6 to 8 inches (approximately 30 pounds) it is preferred that the flow rate be established to be aproximately 10 cubic feet per minute with the pressure drop across the pellets being in the range from 0.10 to 0.3 (preferably 0.22) inches of water. Control of the flow rate is established by the output of the blower 26, the normal pressure drop of the air flowing to the two outlets and the relative size of the flow passages. A blower which proved suitable was a blower sold by Dayton Electric Motor Company and identified as a shaded pole blower, Stock No. 2 C 906, having a rating of 115 volt, 60 cycle, 1570 rpm and 475 cfm at 0.2 inches of water static pressure.

In dispensing insecticide in a warehouse or other large building, it is generally preferred to set the dispenser at a convenient location and to preset its controls to operate during the night when there is no one in the building. Thus the dispenser 10 includes a preset timer 52, a main timer 54 and a main switch 56 all mounted on the front panel 58 of housing 12. The panel 58 also includes the fuses 59 and 61 and the indicator lights 60 and 62 which indicate that the main power supply is on to the preset timer 52 and that the heater 32 is on, respectively.

Electric power is connected to the main switch 56 by suitable means such as a plug extending from dispenser 10. Electric power is provided from switch 56 in series to the high temperature cut-off switch 64, to the preset timer 52 and through the thermostat delay switch 63 to the blower 26. Connections are also provided from preset timer 52 in series to main timer 54, to the thermostat 42 and to the heater elements 32. Indicator light 62 is connected to show that power is available to the preset timer 52 and thus provides an indication of power being supplied to the main switch 56, the main switch being closed and the high temperature cut-off switch 64 being in closed or reset position. As best seen in FIGS. 5 and 6, the high temperature cut-off switch 64 is supported in the space below the inner edge of baffle 36 and above baffle 34. The cut-off switch 64 is of a type having a manual reset so that it may readily be checked and reset if needed during the presetting of the dispenser for operation. A suitable cut-off switch is the type 411-3 manual reset thermostat as sold by Essex Stemco. Resetting of the cut-off switch 64 after the dispenser has been running for a period of time is difficult as the container 18 must first be removed to expose cut-off switch 64 and handling of container 18 after it is heated is done normally only when necessary and with extreme caution. The cut-off switch 64 is exposed to the heated air directly from the heaters 32 so that when an excess heating problem develops it is immediately detected and the power shut off. Resetting is not easily and quickly accomplished because of the location of cut-off switch beneath container 18. Experience has shown that an easily reset high temperature cut-off can result in serious damage to the equipment and possibly be a fire hazard. Thus the cut-off switch 64 being relatively inaccessible during heating avoids these problems.

The delay switch 63 is mounted in a recess in aluminum block 65 which is mounted directly on the side of one of the outer heater bars 32. Shrouding 67 surrounds switch 63 to protect it from the air flowing therearound. This switch 63 is a suitable temperature responsive switch or thermostat which closes as it senses a temperature of approximately 110°F and remains closed until its sensed temperature is reduced to approximately 90°F. A suitable snap disc type of delay switch is sold by Dayton Electric Motor Company as a fan thermostat having stock number 2E 245, an on temperature of 110°F and an off temperature of 90°F. The switch 63 is wired to control the blower 26 whereby the blower 26 does not start until the heater bars 32 have heated the thermostat of switch 63 to 110°F and the blower 26 remains on until the sensed temperature of the heater bars 32 is cooled to 90°F. The above described switch 63 has a tolerance of plus or minus 5°F which is suitable for the control of blower 26.

To operate the dispenser 10, it is placed in the desired location in the enclosed space in which insecticide is to be dispensed. Suitable power supply is connected to the dispenser and the insecticide pellets are dumped into the container 18. The desired operating temperature is set on thermostat 42. The cut-off switch 64 is checked for reset before placing container 18 on housing 10. Since it is preferred to use the dispenser 10 when no one is around, it is generally set up late in the afternoon. The preset timer 52 may be set to turn on the system at the desired time and the main timer 54 is set for the desired length of heating (generally 6 hours). Preset timer 52 can also be set to turn on the circulating system of the enclosed space at a time such as two hours after heater 32 has been shut off by timer 54. As mentioned, the delay switch 63 allows the heater 32 to heat sufficiently before the blower 26 is started and to keep the blower 26 in operation after the heater 32 is shut off until the heater bars are adequately cooled and to allow the air flow to cool the pellets after the insecticide dispensing is completed.

With the dispenser 10 set as described above, the air is heated to the preselected temperature and the controlled volume of heated air flows upwardly through the pellets in container 18. The combined air and insecticide vapor steam discharged from container 18 is blown by the substantially greater air volume discharged from outlet 22 to cause the vapors to be distributed through the building. Outlet 22 is directed in the enclosed space to obtain the maximum dispersion of vapors.

From the foregoing it can be seen that the present invention provides an improved insecticide dispenser which is economical to operate, protects the operator from the pellets during loading and unloading, minimizes pellet spillage, provides accurate control of air flow and air temperature and protects against automatic resetting when shut down by temperatures in excess of the maximum desired temperature. The dispenser constructed in accordance with the present invention has been found to be suitable for dispersing insecticide throughout an enclosed space having volume of from 75,000 to 125,000 cubic feet in a six hour period utilizing only 1,500 units of electrical power for heating.

What is claimed is:

1. An insecticide dispenser, comprising
   a housing
   said housing having an inlet, a first outlet and a second outlet,
   a blower positioned in said housing to receive air from said inlet and to blow air to said outlets,
   a container removably positioned in said first outlet, said container having a portion thereof sufficiently porous to allow flow of air therethrough while supporting insecticide pellets therein, said second outlet being positioned to direct air flowing therefrom across the outlet from said container, a heater supported in said housing in the flow path between said blower and said container whereby the air flowing into said container is heated, a thermostat supported in said housing in said flow path to said container at a point between said heater and said container and connected to control said heater, said thermostat being sufficiently accurate to control the heating of the air to within one degree Fahrenheit of a preselected temperature which preselected temperature may be selected from a group of desired temperatures over a wide range of temperatures, and a timer connected to control the time of operation of the dispenser.

2. An insecticide dispenser according to claim 1, including, a high temperature cut-off switch positioned in the flow path of the heated air flowing to said container, said cut-off switch having a manual reset and being inaccessible from the exterior of said housing without first removing said container.

3. An insecticide dispenser according to claim 1, including a second timer capable of being preset to start the operation of said dispenser at a preselected time.

4. An insecticide dispenser according to claim 1, wherein said thermostat may be set to maintain the air temperature at any one of a plurality of temperatures in the range from 100°F to 230°F.

5. An insecticide dispenser according to claim 1, including means to apportion the flow of air from said blower to said first and second outlets whereby the pressure drop through a bed of insecticide pellets at a flow rate of approximately 10 cfm is in the range from 0.10 to 0.30 inches of water.

6. An insecticide dispenser according to claim 1, wherein said heater has a capacity of 1,500 watts and provides sufficient heat to release sufficient insecticide vapors for a space having a volume as large as 125,000 cubic feet.

7. An insecticide dispenser according to claim 1, wherein said thermostat being capable of maintaining temperature of air flowing through said container within plus or minus 1°F of a preselected temperature.

8. An insecticide dispenser according to claim 1, including a thermostatic delay switch connected to said blower and sensing the temperature of said heater, said delay switch maintaining said blower off until said heater has reached a preselected temperature and maintaining said blower on after said heater is shut off to cool said heater and said pellets.

said second outlet being positioned to direct air flowing therefrom across the outlet from said container, a heater supported in said housing in the flow path between said blower and said container whereby the air flowing into said container is heated, a thermostat supported in said housing in said flow path to said container at a point between said heater and said container and connected to control said heater, said thermostat being sufficiently accurate to control the heating of the air to within 1° Fahrenheit of a preselected temperature which preselected temperature may be selected from a group of desired temperatures over a wide range of temperatures, and a timer connected to control the time of operation of the dispenser.

9. An insecticide dispenser, comprising a housing, a blower, said housing having an inlet, a first outlet, a second outlet, and a flow path from said inlet through said blower to said first outlet and said second outlet, a container removably positioned in said first outlet, said container having a portion thereof sufficiently porous to allow flow of air therethrough while supporting insecticide pellets therein, said second outlet being positioned to direct air flowing therefrom across the outlet from said container, a heater supported in said housing in the flow path between said blower and said container whereby the air flowing into said container is heated, a thermostat supported in said housing in said flow path to said container at a point between said heater and said container and connected to control said heater, means for shielding said thermostat from direct radiation from said heater, a shut-off control from said heater mounted in said first outlet between said heater and said container and being responsive to a preselected maximum desired air temperature, said shut-off control having a manual reset, said shut-off control being positioned below said container and said container fills said first outlet whereby said container blocks access to said control, a timer connected to control the operation of said dispenser, a source of electrical power, and a switch connecting said source of electrical power through said timer to said heater and said fan whereby the warm air flows through insecticide pellets in said container to release insecticide vapors which are dispensed by air flowing through said second outlet.

10. An insecticide dispenser according to claim 9, wherein the flow paths to said outlets restrict the flow through said first outlet so that at a flow rate of 10 cubic feet per minute the pressure drop through a bed of pellets approximately 6 to 8 inches deep and through an area of approximately 160 square inches is between 0.10 and 0.30 inches of water.

* * * * *